(12) United States Patent
Okanishi et al.

(10) Patent No.: US 10,662,324 B2
(45) Date of Patent: *May 26, 2020

(54) PROCESSING AID

(71) Applicant: DAIKIN INDUSTRIES, LTD., Osaka-shi, Osaka (JP)

(72) Inventors: Ken Okanishi, Osaka (JP); Yoshichika Komiya, Osaka (JP); Takafumi Yamato, Osaka (JP); Tsuyoshi Miyamori, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/271,486

(22) Filed: Feb. 8, 2019

(65) Prior Publication Data

US 2019/0177525 A1  Jun. 13, 2019

Related U.S. Application Data

(62) Division of application No. 15/503,102, filed as application No. PCT/JP2015/072507 on Aug. 7, 2015, now Pat. No. 10,308,800.

(30) Foreign Application Priority Data

Aug. 21, 2014 (JP) .................. 2014-168578

(51) Int. Cl.
| | |
|---|---|
| *C08L 23/02* | (2006.01) |
| *C08L 27/12* | (2006.01) |
| *C08J 3/22* | (2006.01) |
| *C08F 259/08* | (2006.01) |
| *C08F 293/00* | (2006.01) |
| *C08K 3/26* | (2006.01) |
| *C08K 3/34* | (2006.01) |
| *C08L 71/02* | (2006.01) |
| *C08L 23/08* | (2006.01) |

(52) U.S. Cl.
CPC ............ *C08L 27/12* (2013.01); *C08F 259/08* (2013.01); *C08F 293/00* (2013.01); *C08J 3/22* (2013.01); *C08K 3/26* (2013.01); *C08K 3/34* (2013.01); *C08L 23/02* (2013.01); *C08L 23/0815* (2013.01); *C08L 71/02* (2013.01); *C08L 2205/06* (2013.01); *C08L 2310/00* (2013.01)

(58) Field of Classification Search
CPC .......... C08L 27/12; C08L 71/02; C08L 23/02; C08L 23/0815; C08L 53/00; C08L 2205/06; C08L 2310/00; C08F 259/08; C08F 293/00; C08K 3/26; C08K 3/34; C08J 3/22

See application file for complete search history.

(56) References Cited

U.S. PATENT DOCUMENTS

| | | | |
|---|---|---|---|
| 4,855,360 A | 8/1989 | Duchesne et al. | |
| 4,976,741 A | 12/1990 | Hisamoto et al. | |
| 5,284,920 A * | 2/1994 | Carlson ................. | C08F 293/00 525/260 |
| 5,710,217 A | 1/1998 | Blong et al. | |
| 5,741,855 A | 4/1998 | Kaduk et al. | |
| 6,635,717 B1 | 10/2003 | Kishine et al. | |
| 10,308,800 B2 * | 6/2019 | Okanishi et al. ....... | C08L 23/02 |
| 2003/0109646 A1 | 6/2003 | Kubo et al. | |
| 2008/0032080 A1 | 2/2008 | Faulkner et al. | |

FOREIGN PATENT DOCUMENTS

| | | |
|---|---|---|
| CN | 1278275 A | 12/2000 |
| JP | 61-285232 A | 12/1986 |
| JP | 63-59405 B2 | 11/1988 |
| JP | 02-70737 A | 3/1990 |
| JP | 2002-544358 A | 12/2002 |
| JP | 2007-510003 A | 4/2007 |
| JP | 4181042 B2 | 11/2008 |
| JP | 2009-227780 A | 10/2009 |
| WO | 00/69967 A1 | 11/2000 |
| WO | 03/040232 A1 | 5/2003 |
| WO | 2005/019334 A1 | 3/2005 |
| WO | 2011/025052 A1 | 3/2011 |

OTHER PUBLICATIONS

Communication dated Oct. 30, 2017, from the European Patent Office in European Application No. 15834257.6.
English Translation of the International Preliminary Report on Patentability and Written Opinion dated Feb. 21, 2017, from the International Bureau in International application No. PCT/JP2015/072507.
International Search Report of PCT/JP2015/072507 dated Oct. 27, 2015.

* cited by examiner

*Primary Examiner* — Nathan M Nutter
(74) *Attorney, Agent, or Firm* — Sughrue Mion, PLLC

(57) ABSTRACT

The invention provides a processing aid enabling short-time disappearance of melt fracture occurred in extrusion-molding a melt-fabricable resin at a high shear rate, a great reduction in extrusion pressure, and production of molded articles with good appearance. The processing aid contains a polymer containing a fluorine-containing elastomeric polymer segment and a fluorine-containing non-elastomeric polymer segment.

2 Claims, 2 Drawing Sheets

PROCESSING AID

CROSS REFERENCE TO RELATED APPLICATIONS

This application is a Divisional Application of U.S. application Ser. No. 15/503,102 filed on Feb. 10, 2017, which is a National Stage of International Application No. PCT/JP2015/072507 filed Aug. 7, 2015, claiming priority based on Japanese Patent Application No. 2014-168578 filed Aug. 21, 2014, the contents of all of which are incorporated herein by reference in their entirety.

TECHNICAL FIELD

The present invention relates to processing aids, molding compositions, processing aid masterbatches, and molded articles.

BACKGROUND ART

Achievement of higher productivity and lower cost in processing melt-fabricable resins requires high-rate extrusion of melt-fabricable resins. However, melt-fabricable resin compositions inevitably have a critical shear rate and, if the extrusion rate is higher than the critical shear rate, the surface of a product becomes roughened (this phenomenon is called melt fracture), causing a failure in providing favorable molded articles.

One example of methods that can solve such a problem to avoid melt fracture and achieve a higher extrusion rate to improve the extrudability is a method of molding a material at a higher molding temperature. However, high-temperature molding causes pyrolysis of melt-fabricable resins, which raises problems such as reduction in mechanical properties of molded articles and staining on molded articles. In addition, the melt-fabricable resins are caused to have a lower melt viscosity, and thus drip off or deform before being cooled and solidified. This impairs the dimensional accuracy of molded articles.

Patent Literature 1 discloses, as another method, a method of producing an extrudable composition including the step of simultaneously mixing i) a first fluoroelastomer that has a first Mooney viscosity $ML_{(1+10)}$ at 121° C. determined in conformity with ASTM D-1646 in an amount of 0.001 to 10 wt % based on the total weight of the extrudable composition, ii) a second fluoroelastomer having a second Mooney viscosity $ML_{(1+10)}$ at 121° C. determined in conformity with ASTM D-1646 in an amount of 0.001 to 10 wt % based on the total weight of the extrudable composition, and iii) a non-fluorinated melt-fabricable polymer, with a difference between the first and second Mooney viscosities of at least 15.

Patent Literature 2 discloses a method including the steps of: preparing a melt-fabricable polymer composition that contains a melt-fabricable thermoplastic host polymer and an effective amount of an additive composition for processing that contains a specific multimode fluoropolymer; mixing the additive composition for processing and the host polymer for a time enough for thorough mixing of them; and melt-fabricating the polymer composition.

The following documents disclose techniques using a fluoropolymer as a processing aid. Patent Literature 3 discloses an extrudable composition containing a thermoplastic hydrocarbon polymer, a poly(oxyalkylene) polymer, and a fluorocarbon polymer. Patent Literature 4 discloses an extrudable composition containing a resin blend that contains a metallocene linear low-density polyethylene resin and a low-density polyethylene resin, a fluoroelastomer that has a Mooney viscosity $ML_{(1+10)}$ at 121° C. of 30 to 60, and a surfactant. Patent Literature 5 discloses a processing aid containing a fluorine-containing polymer that has an acid value of 0.5 KOHmg/g or higher.

Patent Literature 6 discloses a processing aid to be mixed with a thermoplastic hydrocarbon polymer, containing a copolymer of a fluorinated olefin monomer and a substantially non-fluorinated hydrocarbon olefin monomer.

CITATION LIST

Patent Literature

Patent Literature 1: JP 4181042 B
Patent Literature 2: JP 2002-544358 T
Patent Literature 3: JP H02-70737 A
Patent Literature 4: JP 2007-510003 T
Patent Literature 5: WO 2011/025052
Patent Literature 6: U.S. Pat. No. 5,710,217 B

SUMMARY OF INVENTION

Technical Problem

The field of the art still demands processing aids enabling short-time disappearance of melt fracture occurred in extrusion-molding a melt-fabricable resin at a high shear rate, as well as reduction in extrusion pressure and production of molded articles with good appearance.

In view of the above state of the art, the present invention aims to provide a processing aid enabling short-time disappearance of melt fracture occurred in extrusion-molding a melt-fabricable resin at a high shear rate, a great reduction in extrusion pressure, and production of molded articles with good appearance.

Solution to Problem

The inventors examined various means for solving the above problems to find that the above problems can be solved by a processing aid containing a fluorine-containing segmented polymer containing an elastomeric segment and a non-elastomeric segment, thereby completing the present invention.

Specifically, the present invention relates to a processing aid containing a polymer containing a fluorine-containing elastomeric polymer segment and a fluorine-containing non-elastomeric polymer segment.

The fluorine-containing elastomeric polymer segment is preferably a segment derived from at least one fluorine-containing elastomeric polymer selected from the group consisting of vinylidene fluoride/hexafluoropropylene copolymers, vinylidene fluoride/tetrafluoroethylene/hexafluoropropylene copolymers, vinylidene fluoride/perfluoro(alkyl vinyl ether) copolymers, vinylidene fluoride/tetrafluoroethylene/perfluoro(alkyl vinyl ether) copolymers, vinylidene fluoride/hexafluoropropylene/perfluoro(alkyl vinyl ether) copolymers, vinylidene fluoride/chlorotrifluoroethylene copolymers, tetrafluoroethylene/propylene copolymers, and tetrafluoroethylene/perfluoro(alkyl vinyl ether) copolymers.

The fluorine-containing non-elastomeric polymer segment is preferably a segment derived from at least one fluorine-containing non-elastomeric polymer selected from the group consisting of tetrafluoroethylene/hexafluoropropylene copolymers, tetrafluoroethylene/ethylene copolymers, ethylene/tetrafluoroethylene/monomer (a) copolymers, vinylidene fluoride/tetrafluoroethylene copolymers, vinylidene fluoride/hexafluoropropylene copolymers, vinylidene fluoride/chlorotrifluoroethylene copolymers, polytetrafluoroethylene, polychlorotrifluoroethylene, polyvinylidene fluoride, polyvinyl fluoride, chlorotrifluoroethylene/tetrafluoroethylene copolymers, chlorotrifluoroethylene/ethylene copolymers, and tetrafluoroethylene/perfluoro (alkyl vinyl ether) copolymers.

The polymer is preferably a block polymer or a graft polymer.

The processing aid preferably further contains 1 to 99 mass % of a surfactant.

The surfactant is preferably at least one compound selected from the group consisting of silicone-polyether copolymers, aliphatic polyesters, aromatic polyesters, polyether polyols, amine oxides, carboxylic acids, aliphatic esters, and poly(oxyalkylenes), more preferably a poly(oxyalkylene), still more preferably polyethylene glycol.

The processing aid also preferably further contains 1 to 30 parts by mass of an anti-reagglomerating agent relative to 100 parts by mass of the polymer.

The anti-reagglomerating agent is preferably at least one selected from the group consisting of talc, silica, and calcium carbonate.

The present invention also relates to a processing aid masterbatch containing the above processing aid and a melt-fabricable resin, the polymer being contained in an amount more than 0.1 mass % but not more than 20 mass % of the sum of masses of the polymer and the melt-fabricable resin.

The melt-fabricable resin is preferably a polyolefin resin.

The present invention also relates to a molding composition containing the above processing aid and a melt-fabricable resin, the polymer being contained in an amount of 0.0001 to 10 mass % of the sum of masses of the processing aid and the melt-fabricable resin.

The melt-fabricable resin is preferably a polyolefin resin.

The present invention also relates to a molded article obtainable by molding the above molding composition.

Advantageous Effects of Invention

The processing aid of the present invention enables short-time disappearance of melt fracture occurred in extrusion-molding a melt-fabricable resin at a high shear rate, a great reduction in extrusion pressure, and production of molded articles with good appearance. The processing aid is also expected to restrain sedimentation of die drool (die build up) at ejection nozzle tips of dies of extrusion-molding devices.

DESCRIPTION OF EMBODIMENTS

Figure 1:
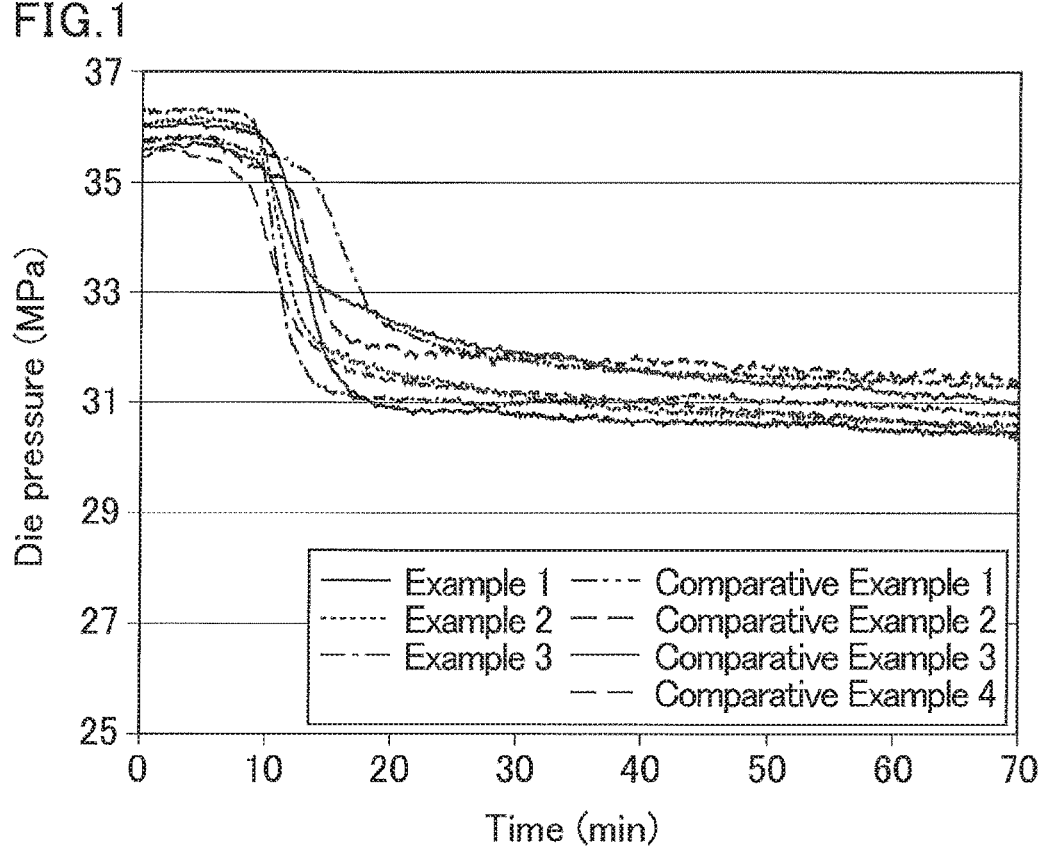
FIG. 1 is a chart of die pressure changes over time in extrusion of Examples 1 to 3 and Comparative Examples 1 to 4.

The present invention will be specifically described hereinbelow.

The processing aid of the present invention contains a polymer containing a fluorine-containing elastomeric polymer segment and a fluorine-containing non-elastomeric polymer segment.

The fluorine-containing elastomeric polymer segment preferably has a unit derived from at least one fluoromonomer selected from the group consisting of tetrafluoroethylene (TFE), hexafluoropropylene (HFP), chlorotrifluoroethylene (CTFE), vinyl fluoride, vinylidene fluoride (VDF), trifluoroethylene, hexafluoroisobutylene, monomers represented by $CH_2=CZ^1(CF_2)_nZ^2$ (where $Z^1$ is H or F; $Z^2$ is H, F, or Cl; and n is an integer of 1 to 10), perfluoro(alkyl vinyl ethers) (PAVEs) represented by $CF_2=CF-ORf^6$ (where $Rf^6$ is a C1-C8 perfluoroalkyl group), and alkyl perfluorovinyl ether derivatives represented by $CF_2=CF-O-CH_2-Rf^7$ (where $Rf^7$ is a C1-C5 perfluoroalkyl group).

The fluorine-containing elastomeric polymer segment preferably has a VDF unit or a TFE unit, more preferably has a VDF unit.

The proportion of the VDF unit is preferably 30 to 85 mol %, more preferably 50 to 80 mol %, relative to all the monomer units constituting the fluorine-containing elastomeric polymer segment. If the fluorine-containing elastomeric polymer segment has no VDF unit, the proportion of the TFE unit is preferably 45 to 90 mol %, more preferably 55 to 70 mol %, relative to all the monomer units constituting the fluorine-containing elastomeric polymer segment.

The fluorine-containing elastomeric polymer segment is preferably a segment derived from at least one fluorine-containing elastomeric polymer selected from the group consisting of VDF/HFP copolymers, VDF/TFE/HFP copolymers, VDF/TFE/2,3,3,3-tetrafluoro-1-propene copolymers, VDF/PAVE copolymers, VDF/TFE/PAVE copolymers, VDF/HFP/PAVE copolymers, VDF/CTFE copolymers, VDF/2,3,3,3-tetrafluoro-1-propene copolymers, TFE/propylene copolymers, and TFE/PAVE copolymers.

The VDF/HFP copolymers preferably have a VDF/HFP ratio of (45 to 85)/(55 to 15) (mol %), more preferably (50 to 80)/(50 to 20) (mol %), still more preferably (60 to 80)/(40 to 20) (mol %).

The VDF/TFE/HFP copolymers preferably have a VDF/TFE/HFP ratio of (30 to 80)/(4 to 35)/(10 to 35) (mol %).

The VDF/TFE/2,3,3,3-tetrafluoro-1-propene copolymers preferably have a VDF/TFE/2,3,3,3-tetrafluoro-1-propene ratio of (30 to 80)/(4 to 35)/(10 to 35) (mol %).

The VDF/PAVE copolymers preferably have a VDF/PAVE ratio of (65 to 90)/(35 to 10) (mol %).

The VDF/TFE/PAVE copolymers preferably have a VDF/TFE/PAVE ratio of (40 to 80)/(3 to 40)/(15 to 35) (mol %).

The VDF/HFP/PAVE copolymers preferably have a VDF/HFP/PAVE ratio of (65 to 90)/(3 to 25)/(3 to 25) (mol %).

The VDF/CTFE copolymers preferably have a VDF/CTFE ratio of (30 to 90)/(70 to 10) (mol %).

The VDF/2,3,3,3-tetrafluoro-1-propene copolymers preferably have a VDF/2,3,3,3-tetrafluoro-1-propene copolymer ratio of (30 to 90)/(70 to 10) (mol %).

The TFE/propylene copolymers preferably have a TFE/propylene ratio of (45 to 90)/(55 to 10) (mol %).

The TFE/PAVE copolymers preferably have a TFE/PAVE ratio of (65 to 90)/(35 to 10) (mol %).

The fluorine-containing elastomeric polymer segment is preferably a segment derived from a copolymer containing a VDF unit, more preferably a segment derived from at least one fluorine-containing elastomeric polymer selected from the group consisting of VDF/HFP copolymers, VDF/HFP/TFE copolymers, VDF/2,3,3,3-tetrafluoro-1-propene copolymers, and VDF/TFE/2,3,3,3-tetrafluoro-1-propene copolymers, still more preferably a segment derived from at least one fluorine-containing elastomeric polymer selected from the group consisting of VDF/HFP copolymers and VDF/HFP/TFE copolymers.

The fluorine-containing elastomeric polymer segment preferably has a Mooney viscosity $ML_{(1+10)}$ of 10 to 100. The Mooney viscosity $ML_{(1+10)}$ is more preferably 20 or higher, still more preferably 30 or higher, while more preferably 80 or lower, still more preferably 60 or lower.

The Mooney viscosity $ML_{(1+10)}$ can be determined at 121° C. using a Mooney viscometer MV2000E (Alpha Technologies Inc.) in conformity with ASTM D-1646.

The fluorine-containing elastomeric polymer segment preferably has a glass transition temperature of −70° C. or higher, more preferably −60° C. or higher, still more preferably −50° C. or higher, while preferably 5° C. or lower, more preferably 0° C. or lower, still more preferably −3° C. or lower.

The glass transition temperature can be determined as follows. Specifically, 10 mg of a sample is heated at 10° C./min using a differential scanning calorimeter (DSC822e, Mettler-Toledo International Inc.) to provide a DSC curve, and the temperature indicated by the middle point of two intersections between each of the extended lines of the base lines before and after the secondary transition on the DSC curve and the tangent at the inflection point on the DSC curve is defined as the glass transition temperature.

The fluorine-containing non-elastomeric polymer segment preferably has a unit derived from at least one fluoromonomer selected from the group consisting of tetrafluoroethylene (TFE), hexafluoropropylene (HFP), chlorotrifluoroethylene (CTFE), vinyl fluoride, vinylidene fluoride (VDF), trifluoroethylene, hexafluoroisobutylene, monomers represented by $CH_2=CZ^1(CF_2)_nZ^2$ (where $Z^1$ is H or F; $Z^2$ is H, F, or Cl; and n is an integer of 1 to 10), perfluoro(alkyl vinyl ethers) (PAVEs) represented by $CF_2=CF-ORf^6$ (where $Rf^6$ is a C1-C8 perfluoroalkyl group), and alkyl perfluorovinyl ether derivatives represented by $CF_2=CF-O-CH_2-Rf^7$ (where $Rf^7$ is a C1-05 perfluoroalkyl group).

The fluorine-containing non-elastomeric polymer segment preferably has a VDF unit, a TFE unit, or a CTFE unit, more preferably has a VDF unit or a TFE unit.

The proportion of the VDF unit is preferably 20 to 100 mol %, more preferably 40 to 100 mol %, relative to all the monomer units constituting the fluorine-containing non-elastomeric polymer segment. The proportion of the TFE unit is preferably 20 to 100 mol %, more preferably 40 to 100 mol %, relative to all the monomer units constituting the fluorine-containing non-elastomeric polymer segment.

The fluorine-containing non-elastomeric polymer segment is preferably a segment derived from at least one fluorine-containing non-elastomeric polymer selected from the group consisting of TFE/HFP copolymers, TFE/ethylene copolymers, ethylene/TFE/monomer (a) copolymers, VDF/TFE copolymers, polytetrafluoroethylene (PTFE), polychlorotrifluoroethylene (PCTFE), polyvinylidene fluoride (PVDF), VDF/HFP copolymers, VDF/CTFE copolymers, polyvinyl fluoride, CTFE/TFE copolymers, CTFE/ethylene copolymers, and TFE/PAVE copolymers.

The monomer (a) is preferably a monomer copolymerizable with TFE and ethylene, and preferably at least one selected from the group consisting of HFP, pentafluoropropylene, 3,3,3-trifluoropropylene-1, 2-trifluoromethyl-3,3,3-trifluoropropylene-1, PAVE, (perfluoroalkyl)ethylenes, and compounds represented by $CH_2=CX-(CF_2)_nZ$ (where X and Z may be the same as or different from each other, and are individually a hydrogen atom or a fluorine atom; and n is an integer of 2 to 8). Examples of the (perfluoroalkyl)ethylenes include (perfluorobutyl)ethylene and (perfluorohexyl)ethylene. Examples of the compounds represented by $CH_2=CX-(CF_2)_nZ$ include $CH_2=CFCF_2CF_2CF_2H$ and $CH_2=CFCF_2CF_2CF_2CF_2H$.

The TFE/ethylene copolymers preferably have a TFE/ethylene ratio of (20 to 90)/(80 to 10) (mol %), more preferably (37 to 85)/(63 to 15) (mol %), still more preferably (38 to 80)/(62 to 20) (mol %).

The ethylene/TFE/monomer (a) ratio is preferably (79.9 to 10)/(20 to 89.9)/(0.1 to 14) (mol %), more preferably (62.9 to 15)/(37 to 84.9)/(0.1 to 10) (mol %), still more preferably (61.8 to 20)/(38 to 79.8)/(0.2 to 8) (mol %).

The VDF/TFE copolymers preferably have a VDF/TFE ratio of (0.1 to 99.9)/(99.9 to 0.1) (mol %), more preferably (10 to 90)/(90 to 10) (mol %).

The VDF/HFP copolymers preferably have a VDF/HFP ratio of (70 to 99.9)/(30 to 0.1) (mol %), more preferably (85 to 99.9)/(15 to 0.1) (mol %).

The VDF/CTFE copolymers preferably have a VDF/CTFE ratio of (70 to 99.9)/(30 to 0.1) (mol %), more preferably (85 to 99.9)/(15 to 0.1) (mol %).

The fluorine-containing non-elastomeric polymer segment is more preferably a segment derived from at least one fluorine-containing non-elastomeric polymer selected from the group consisting of TFE/ethylene copolymers, ethylene/TFE/monomer (a) copolymers, PVDF, VDF/TFE copolymers, CTFE/ethylene copolymers, and CTFE/ethylene/monomer (a) copolymers.

In order to enjoy the effects in extrusion molding not only at a high shear rate but also at a low shear rate, the fluorine-containing non-elastomeric polymer segment is preferably a segment derived from at least one fluorine-containing non-elastomeric polymer selected from the group consisting of PVDF, VDF/HFP copolymers, VDF/CTFE copolymers, and VDF/TFE copolymers.

Since conventional processing aids improve the extrudability only within a narrow shear rate range and have respective optimal shear rate ranges, users need to choose an optimal processing aid for the target shear rate. Thus, they demand a processing aid enabling, regardless of the shear rate level, disappearance of melt fracture in a shorter time, as well as reduction in extrusion pressure and production of molded articles with good appearance. The inventors have performed studies to find that a fluorine-containing non-elastomeric polymer having a segment derived from the above polymer leads to excellent effects regardless of the shear rate level.

The polymer may be a block polymer or a graft polymer.

The block polymer is preferably one represented by the formula:

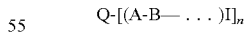

(wherein Q is a residue after separation of an iodine atom from an iodide compound; A, B, . . . are polymer chain segments (at least one of them is a fluorine-containing elastomeric polymer segment and at least one of them is a fluorine-containing non-elastomeric polymer segment); I is the iodine atom isolated from the iodide compound; and n is the valence of Q). The block polymer preferably essentially includes a chain consisting of at least two polymer chain segments, an iodine atom, and a residue after separation of at least one iodine atom from an iodide compound, the iodine atom and the residue bonding to the respective ends of the chain.

Examples of the iodide compound include monoiodoperfluoromethane, 2-iodo-1-hydroperfluoroethane, 2-iodoperfluoropropane, 1,4-diiodoperfluorobutane, 1,3-diiodoperfluoropropane, 2-chloro-1,3-diiodoperfluoropropane, 2,4-dichloro-1,5-diiodoperfluoropentane, and 4-iodoperfluorobutene-1.

Examples of the block polymer include polymers having a chain of (fluorine-containing elastomeric polymer segment)-(fluorine-containing non-elastomeric polymer segment), polymers having a chain of (fluorine-containing elastomeric polymer segment)-(fluorine-containing non-elastomeric polymer segment)-(fluorine-containing elastomeric polymer segment), and polymers having a chain of (fluorine-containing non-elastomeric polymer segment)-(fluorine-containing elastomeric polymer segment)-(fluorine-containing non-elastomeric polymer segment).

The block polymer is obtainable by a known method. Examples of such a method include a method including radical-polymerizing a fluoromonomer in the presence of an iodide compound to provide a fluorine-containing elastomeric polymer in which an iodine atom bonds to at least one end, and then radical-polymerizing a fluoromonomer to the fluorine-containing elastomeric polymer to provide a polymer containing a fluorine-containing elastomeric polymer segment and a fluorine-containing non-elastomeric polymer segment. If necessary, another fluoromonomer may be radical-polymerized to the polymer to provide a polymer having a third segment. Production methods disclosed in JP S62-21805 B and JP S63-59405 B may also be used.

Examples of the graft polymer include polymers obtainable by a production method including radical-copolymerizing a fluoromonomer and a monomer having both a double bond and a peroxide bond in the molecule to provide a fluorine-containing elastomeric polymer serving as a main chain polymer and graft-polymerizing a fluoromonomer in the presence of the fluorine-containing elastomeric polymer.

Examples of the monomer having both a double bond and a peroxide bond in the molecule include t-butyl peroxymethacrylate, di(t-butylperoxy)fumarate, t-butyl peroxycrotonate, t-butyl peroxyallyl carbonate, t-hexyl peroxyallyl carbonate, 1,1,3,3-tetramethyl peroxyallyl carbonate, t-butyl peroxymetallyl carbonate, 1,1,3,3-tetramethylbutyl peroxymetallyl carbonate, p-menthane peroxyallyl carbonate, and p-menthane peroxymetallyl carbonate.

The graft polymer may be produced by methods disclosed in JP H02-305844 A and JP H03-139547 A.

The polymer preferably satisfies the ratio of SS to the sum of SS and HS (SS/(SS+HS), where SS means the fluorine-containing elastomeric polymer segment and HS means the fluorine-containing non-elastomeric polymer segment) is 1 to 99, more preferably 50 or higher, still more preferably 60 or higher, while more preferably 90 or lower, still more preferably 80 or lower. If the proportion of the fluorine-containing elastomeric polymer segment is too high, the resulting processing aid may fail to sufficiently reduce the extrusion pressure at a high shear rate. If the proportion of the fluorine-containing non-elastomeric polymer segment is too high, the resulting processing aid may fail to sufficiently reduce the extrusion pressure at a low shear rate.

The polymer preferably has a melting point of 120° C. to 280° C., more preferably 140° C. or higher, still more preferably 160° C. or higher, while more preferably 270° C. or lower, still more preferably 230° C. or lower.

The melting point is the temperature corresponding to the maximum value on a heat-of-fusion curve obtained using a differential scanning calorimeter (DSC) at a temperature-increasing rate of 10° C./min.

The polymer preferably has a melt flow rate (MFR) of 0.1 to 80 g/10 min. The MFR is more preferably 0.5 or higher, still more preferably 1 or higher, while more preferably 50 or lower, still more preferably 30 or lower.

The MFR is determined at an appropriate temperature corresponding to the melting point of the fluorine-containing non-elastomeric polymer segment. If the fluorine-containing non-elastomeric polymer segment is an ethylene/TFE/monomer (a) copolymer, the MFR can be determined at 250° C. If the fluorine-containing non-elastomeric polymer segment is polyvinylidene fluoride (PVDF), the MFR can be determined at 230° C.

In one preferred embodiment, the processing aid of the present invention contains a surfactant in addition to the above polymer. Such combination use of the polymer with a surfactant can lead, even in a reduced amount of the polymer, to the performance of the processing aid equal to or higher than that achieved without a surfactant.

The surfactant, if contained in the molding composition to be mentioned later, is preferably a compound that has a lower melt viscosity than the melt-fabricable resin at a molding temperature and can wet the surface of the polymer. The surfactant and the melt-fabricable resin are different compounds.

The surfactant is preferably at least one surfactant selected from the group consisting of silicone-polyether copolymers, aliphatic polyesters, aromatic polyesters, polyether polyols, amine oxides, carboxylic acids, aliphatic esters, and poly(oxyalkylenes). These surfactants have a lower melt viscosity than the polymer. Thus, the surfactant, when mixed with the polymer, can wet the surface of the polymer, sufficiently serving as a surfactant. More preferred are poly(oxyalkylenes).

Preferred among the poly(oxyalkylenes) is polyethylene glycol. Polyethylene glycol preferably has a number average molecular weight of 50 to 20000, more preferably 1000 to 15000, still more preferably 2000 to 9500. The number average molecular weight of the polyethylene glycol is a value calculated from the hydroxyl value determined in conformity with JIS K0070.

Preferred among the aliphatic polyesters is polycaprolactone. Polycaprolactone preferably has a number average molecular weight of 1000 to 32000, more preferably 2000 to 10000, still more preferably 2000 to 4000.

The amount of the surfactant contained is preferably 1 to 99 mass %, more preferably 5 to 90 mass %, still more preferably 10 to 80 mass %, particularly preferably 20 to 70 mass %, in the processing aid.

The amount of the surfactant is also preferably 50 mass % or more, more preferably more than 50 mass %.

The processing aid of the present invention may contain an anti-reagglomerating agent. Containing the anti-reagglomerating agent restrains reagglomeration of the polymer.

The anti-reagglomerating agent is preferably a powder of an inorganic compound. For example, the anti-reagglomerating agent is preferably powder of an inorganic compound to be mentioned hereinbelow as an example of a filler, a colorant, or an acid acceptor.

the anti-reagglomerating agent used may be one usually used as a filler, a colorant, an acid acceptor, or the like.

Examples of the filler include barium sulfate, calcium carbonate, graphite, talc, and silica.

Examples of the colorant include metal oxides such as titanium oxide, iron oxide, and molybdenum oxide.

Examples of the acid acceptor include magnesium oxide, calcium oxide, and lead oxide.

The anti-reagglomerating agent is preferably the filler. The anti-reagglomerating agent is more preferably at least one selected from the group consisting of talc, silica, and calcium carbonate.

The anti-reagglomerating agent is preferably powder having an average particle size of 0.01 µm or greater and 50 µm or smaller. The average particle size of the powder is more preferably 0.05 µm or greater and 30 µm or smaller, still more preferably 0.1 µm or greater and 10 µm or smaller. The average particle size of the anti-reagglomerating agent is a value determined in conformity with ISO 13320-1.

The anti-reagglomerating agent may be surface-treated with a coupling agent, if necessary.

The amount of the anti-reagglomerating agent is preferably 1 to 30 parts by mass, more preferably 3 to 20 parts by mass, still more preferably 5 to 15 parts by mass, relative to 100 parts by mass of the polymer.

The anti-reagglomerating agent may include one species thereof or two or more species thereof.

The processing aid of the present invention may further contain any additive such as antioxidants, ultraviolet absorbers, and flame retardants in addition to the above components.

The molding composition of the present invention contains a melt-fabricable resin and the aforementioned processing aid of the present invention. The melt-fabricable resin herein means a polymer whose melt flow is determinable at a temperature higher than the crystalline melting point in conformity with ASTM D-1238 and D-2116.

The melt-fabricable resin may be any resin, and preferably a fluorine-free resin. Examples thereof include polyolefin resins such as polyethylene and polypropylene; polyamide (PA) resins such as nylon 6, nylon 11, nylon 12, nylon 46, nylon 66, nylon 610, nylon 612, and nylon MXD6; polyesters such as polyethylene terephthalate (PET), polybutylene terephthalate (PBT), polyarylates, aromatic polyesters (including liquid crystal polyesters), and polycarbonate (PC); polyacetal (POM) resin; polyether resins such as polyphenylene oxide (PPO), modified polyphenylene ether, and polyether ether ketone (PEEK); polyamide imide (PAI) resins such as polyamino bismaleimide; polysulfone resins such as polysulfone (PSF) and polyether sulfone (PES); vinyl polymers such as ABS resin and poly 4-methylpentene-1 (TPX resin); polyphenylene sulfide (PPS); polyketone sulfide; polyether imide; and polyimide (PI). The nylon MXD6 is a crystallizable polycondensation product obtainable from methaxylene diamine (MXD) and adipic acid.

The melt-fabricable resin is preferably a polyolefin resin and/or a PA resin, more preferably a polyolefin resin.

For easy melt fabrication, the melt-fabricable resin in the molding composition is preferably a thermoplastic resin. The molding composition of the present invention may contain one or two or more of the above melt-fabricable resins.

The melt-fabricable resin preferably has a melt-fabricable temperature of 100° C. to 350° C. The melt-fabricable resin may or may not have crystallizability.

The melt-fabricable resin, if having crystallizability, preferably has a melting point of 80° C. to 300° C., more preferably 100° C. to 200° C. The melt-fabricable resin, if having no crystallizability, preferably has a fabricable temperature which is substantially equal to that of a crystallizable melt-fabricable resin whose melting point range is known. The melting point of the crystallizable melt-fabricable resin can be determined using a DSC device.

The melt-fabricable resin can be synthesized by a conventionally known method in accordance with the type thereof, for example.

The melt-fabricable resin may be in the form of powder, granules, pellets, or the like. In order to efficiently melt the melt-fabricable resin in the resulting molding composition and to disperse the processing aid therein, the melt-fabricable resin is preferably in the form of pellets.

The molding composition of the present invention preferably contains the polymer in an amount of 0.0001 to 10 mass % of the sum of the masses of the processing aid containing the polymer and the melt-fabricable resin.

The amount of the polymer is more preferably 0.001 mass % or more, while more preferably 5 mass % or less, still more preferably 0.5 mass % or less, of the sum of the masses of the processing aid containing the polymer and the melt-fabricable resin.

The molding composition may be prepared by adding the processing aid of the present invention itself to the melt-fabricable resin, or may be prepared by adding the processing aid in the form of the processing aid masterbatch to be mentioned later to the melt-fabricable resin.

The molding composition of the present invention may further contain other components, if necessary, in addition to the processing aid and the melt-fabricable resin.

Examples of the components include reinforcing materials such as glass fibers and glass powder; stabilizers such as minerals and flakes; lubricants such as silicone oil and molybdenum disulfide; pigments such as titanium dioxide and red iron oxide; conductive agents such as carbon black; impact-resistance improvers such as rubber; antioxidants such as hindered phenol antioxidants and phosphorus antioxidants; core-forming agents such as metal salts and acetals of sorbitol; and other additives recorded in the positive list that is formulated as voluntary standards by Japan Hygienic Olefin And Styrene Plastics Association.

The processing aid masterbatch of the present invention contains the aforementioned processing aid of the present invention and the melt-fabricable resin. The processing aid masterbatch of the present invention can be suitably used as a processing aid in molding the melt-fabricable resin.

In the processing aid masterbatch of the present invention, the polymer is uniformly dispersed in the melt-fabricable resin. Thus, adding the masterbatch in molding the melt-fabricable resin leads to improvement of the molding processability, such as decreases in extrusion torque and extrusion pressure.

Examples of the melt-fabricable resin include the same melt-fabricable resins as mentioned above, and the melt-fabricable resin is preferably a polyolefin resin, more preferably polyethylene.

The processing aid masterbatch of the present invention may be in any form such as powder, granules, pellets, or the like. In order to keep the polymer in the state of being finely dispersed in the melt-fabricable resin, the masterbatch is preferably in the form of pellets obtainable by melt-kneading.

For easy melt fabrication, the processing aid masterbatch of the present invention preferably contains the polymer in an amount higher than 0.1 mass % but not higher than 20 mass % of the sum of the masses of the melt-fabricable resin and the processing aid containing the polymer. The lower limit of the amount of the polymer is more preferably 0.3 mass %, still more preferably 0.6 mass %, of the sum of the masses, whereas the upper limit thereof is more preferably 10 mass %.

The processing aid masterbatch of the present invention may further contain other components, if necessary, in addition to the processing aid and the melt-fabricable resin.

The components may be any components, and examples thereof include those mentioned for the molding composition of the present invention.

The processing aid masterbatch of the present invention may be obtainable by kneading, at 100° C. to 350° C., a matter prepared by adding the processing aid and other desired components to the melt-fabricable resin. For good dispersibility of the polymer, the masterbatch is preferably one obtainable by adding the above processing aid prepared in advance to the melt-fabricable resin and kneading the components within the above temperature range.

The molded article of the present invention is obtainable by molding the molding composition of the present invention.

The molding may be performed by preparing the molding composition of the present invention in advance, putting the composition into a molding device, and then melting and extruding the composition, or may be performed by putting the above processing aid and melt-fabricable resin into a molding device at once, and then melting and extruding the components, or may be performed by putting the above processing aid masterbatch and melt-fabricable resin into a molding device at once, and then melting and extruding the components.

The molding composition may be molded by any method such as extrusion molding, injection molding, or blow molding. In order to effectively enjoy the molding processability, extrusion molding is preferred.

The molding may be performed under any conditions, and the conditions may be appropriately adjusted in accordance with the composition and amount of the molding composition to be used, the shape and size of a desired molded article, and other factors.

The molding temperature is usually not lower than the melting point of the melt-fabricable resin in the molding composition but lower than the lower temperature selected from the decomposition temperatures of the processing aid and the melt-fabricable resin, and is within the range of 100° C. to 350° C.

In the case of extrusion molding, the molding temperature is also referred to as the extrusion temperature.

The present invention also relates to a method of extruding a molding composition, including adding the processing aid to the melt-fabricable resin to provide a molding composition and extruding the molding composition.

The molded article of the present invention may have any of various shapes, such as a sheet shape, a film shape, a rod shape, a pipe shape, or a fibrous shape.

The molded article may be used in any application in accordance with the type of the melt-fabricable resin used. For example, the molded article can be suitably used in applications strongly requiring mainly physical properties, such as mechanical properties, and surface properties.

Examples of the applications of the molded article include films, bags, coating materials, tablewares such as containers for beverages, cables, pipes, fibers, bottles, gasoline tanks, and other molded articles in various industries.

EXAMPLES

The present invention will be more specifically described referring to examples and comparative examples.

Still, the invention is not limited to these examples.

The measured values described in the following examples and comparative examples are values determined by the following methods.

1. Composition of Copolymer

The composition of the copolymer was determined using a $^{19}$F-NMR device (AC300P, Bruker Corp.).

2. Melt Flow Rate (MFR)

The melt flow rate was determined in conformity with ASTM D-3159.

The MFR of Fluorine-containing Polymers 2 and 3, Fluorine-containing Polymer 1, PVDF 1, and PVDF 2 were respectively determined at 250° C. and 98 N, at 230° C. and 98 N, at 230° C. and 198 N, and at 230° C. and 98 N.

3. Melting Point (mp)

The temperature corresponding to the maximum value on a heat-of-fusion curve obtained using a DSC device (Seiko Instruments Inc.) at a temperature-increasing rate of 10° C./min was defined as the melting point.

4. Melt Fracture Disappearance Time

A polyolefin alone was extruded until the pressure was stabilized with melt fracture occurring on the entire surface. At the time when the screw of the extruder became visible, the materials such as a processing aid of the corresponding composition were put into a hopper. This timing was defined as 0. Then, the period of time from 0 to the time when the melt fracture disappeared and the entire surface of the molded article became smooth was defined as the melt fracture disappearance time. The disappearance of the melt fracture was confirmed by visual observation and touch examination.

If the visual observation and touch examination confirm that the entire surface does not have a gloss, smooth surface with no melt fracture but have a stripe-like, entirely or partially undulated surface, this state is called "shark skin" herein.

5. Pressure Decrease

In the extrusion evaluation to be mentioned later, the extrusion starts with an initial extrusion pressure observed when linear low-density polyethylene alone is used without addition of a processing aid (initial pressure). The pressure is then decreased as the processing aid is added and the effects thereof are exerted, and finally the pressure is stabilized at substantially a constant pressure (stabilized pressure). The difference between the initial pressure and the stabilized pressure was defined as the pressure decrease.

If the pressure was not stabilized within the set period of time, the difference between the initial pressure and the pressure at the finish time was defined as the pressure decrease.

(Production of Processing Aids)

Processing aids used in Examples 1 to 3 were prepared by the following method.

Fluorine-containing Polymers 1 to 3 were produced in substantially the same manner as in the polymerization methods of Examples 1 and 2 disclosed in JP S63-59405 B and the polymerization method of the examples disclosed in JP S62-21805 B. Table 1 shows the compositions of Fluorine-containing Polymers 1 to 3.

Separately, talc (Jetfine 1A, Luzenac), silica (SYLOBLOC 45H, Grace & Co.), and calcium carbonate (Brilliant 1500, Shiraishi Kogyo Kaisha, Ltd.) were mixed in a mass ratio of 3/6/2 to prepare an anti-reagglomerating agent.

Then, one of Fluorine-containing Polymers 1 to 3 and the anti-reagglomerating agent were mixed in a mass ratio of 90/10 to provide a processing aid.

TABLE 1

| | Composition of fluorine-containing polymer (mol %) | | | | | | | Proportion of SS (%) | Melting point (° C.) | MFR (g/10 min) |
|---|---|---|---|---|---|---|---|---|---|---|
| | Elastomeric segment (SS) | | | Non-elastomeric segment (HS) | | | | | | |
| | TFE | VDF | HFP | TFE | Ethylene | HFP | VDF | | | |
| Fluorine-containing Polymer 1 | 20 | 50 | 30 | 0 | 0 | 0 | 100 | 85 | 165 | 3 |
| Fluorine-containing Polymer 2 | 20 | 50 | 30 | 49 | 43 | 8 | 0 | 85 | 233 | 19 |
| Fluorine-containing Polymer 3 | 20 | 50 | 30 | 49 | 43 | 8 | 0 | 75 | 232 | 6 |

The abbreviations in Table 1 mean as follows.
TFE: tetrafluoroethylene
VDF: vinylidene fluoride
HFP: hexafluoropropylene The processing aid used in Comparative Example 1 was prepared by the following method.

A VDF/HFP copolymer (FKM) (VDF/HFP=78/22 mol %, Mooney viscosity: 40) was produced in substantially the same manner as in the polymerization method of the examples disclosed in JP 5140902 B.

Separately, talc (Jetfine 1A, Luzenac), silica (SYLOBLOC 45H, Grace & Co.), and calcium carbonate (Brilliant 1500, Shiraishi Kogyo Kaisha, Ltd.) were mixed in a mass ratio of 3/6/2 to prepare an anti-reagglomerating agent.

Then, the FKM and the anti-reagglomerating agent were mixed in a mass ratio of 90/10 to provide a processing aid.

The processing aid used in Comparative Example 2 was prepared by the following method.

A VDF/HFP copolymer (FKM) (VDF/HFP=78/22 mol %, Mooney viscosity: 40) was produced in substantially the same manner as in the polymerization method of the examples disclosed in JP 5140902 B.

The FKM and polyethylene glycol (CARBOWAX™ SENTRY™ POLYETHYLENE GLYCOL 8000 GRANULAR, The Dow Chemical Company, hereinafter, referred to as "PEG") were mixed in a mass ratio of 1/2 to provide a processing aid.

In Comparative Example 3, a PVDF homopolymer (melting point: 159° C., MFR: 4.4) (hereinafter, referred to as "PVDF 1") produced by a known emulsion polymerization method was used as a processing aid.

In Comparative Example 4, modified PVDF (HFP 4.5 mol %, melting point: 144° C., MFR: 1.1) (hereinafter, referred to as "PVDF 2") produced by a known emulsion polymerization method was used as a processing aid.

(Production of Masterbatch)

The processing aid was mixed with linear low-density polyethylene (LLDPE 1002YB, ExxonMobil Corp.) such that the amount of the processing aid was 5 wt % relative to the sum of the weights of the linear low-density polyethylene and the processing aid, and then 0.1 wt % of IRGANOX B225 (BASF) was mixed therewith. The mixture was put into a twin-screw extruder (Labo Plastomill 30C150, screw L/D, Toyo Seiki Seisakusho, Ltd.) and was processed at a screw rotational speed of 80 rpm. Thereby, pellets containing the processing aid were obtained. In order to improve the dispersion homogeneity of the processing aid in the resulting masterbatch, the obtained pellets containing the processing aid were mixed using a tumbler mixer and the mixture was processed at a screw rotational speed of 100 rpm, while the other conditions were the same as for providing the pellets. Thereby, a processing aid-containing masterbatch containing the processing aid and the polyolefin was obtained.

(1) The temperature conditions in extrusion of Fluorine-containing Polymers 1 and 2 were as follows.

Condition 1: cylinder temperature=150° C., 250° C., and 250° C.; die temperature=180° C.

(2) The temperature conditions in extrusion of Fluorine-containing Polymer 3, FKM, and FKM+PEG were as follows.

Condition 2: cylinder temperature=150° C., 170° C., and 180° C.; die temperature=180° C.

(3) The temperature conditions in extrusion of PVDF 1 and PVDF 2 were as follows.

Condition 3: cylinder temperature=150° C., 180° C., and 190° C.; die temperature=180° C.

An ultrathin slice was cut out of the resulting pellets and was microscopically observed using a reflected light microscope. The resulting image was binarized using an optical analyzer. This confirmed that, in the respective masterbatches, the processing aid in the form of fine particles was dispersed in the linear low-density polyethylene in the resulting pellets. In each case, the average dispersed particle size thereof, determined on the binarized image, was 5 μm or smaller.

(Extrusion Evaluation 1)

Example 1

The masterbatch containing 5 wt % Fluorine-containing Polymer 1 was added to and tumble-mixed with linear low-density polyethylene (LLDPE 1201XV, ExxonMobil Corp.) such that the amount of the masterbatch was 1 wt % relative to the sum of the weights of the linear low-density polyethylene and the masterbatch. The resulting masterbatch-containing linear low-density polyethylene was extruded using a single screw extruder (Rheomex OS, HAAKE, L/D: 33, screw diameter: 20 mm, die diameter: 2 mmϕ×40 mmL) at a cylinder temperature of 210° C. to 240° C., a die temperature of 240° C., and a screw rotational speed of 80 rpm. The die pressure change and the melt fracture change were observed.

Example 2

Extrusion evaluation was performed in the same manner as in Example 1 except that masterbatch containing 5 wt % Fluorine-containing Polymer 2 was added.

Example 3

Extrusion evaluation was performed in the same manner as in Example 1 except that masterbatch containing 5 wt % Fluorine-containing Polymer 3 was added.

Comparative Example 1

Extrusion evaluation was performed in the same manner as in Example 1 except that masterbatch containing 5 wt % FKM was added.

Comparative Example 2

Extrusion evaluation was performed in the same manner as in Example 1 except that masterbatch containing 5 wt % FKM+PEG was added.

Comparative Example 3

Extrusion evaluation was performed in the same manner as in Example 1 except that masterbatch containing 5 mass % PVDF 1 was added.

Comparative Example 4

Extrusion evaluation was performed in the same manner as in Example 1 except that masterbatch containing 5 wt % PVDF 2 was added.

Before the experiments, the extruder was purged for about 15 minutes by putting linear low-density polyethylene containing 15 wt % silica into a hopper and increasing the screw rotational speed up to 150 rpm. Then, the extruder was further purged for about 15 minutes using the same linear low-density polyethylene (LLDPE 1201XV, ExxonMobil Corp.) as used in the experiments. Thereafter, the screw rotational speed was returned to 80 rpm and extrusion was performed until the temperature was stabilized. After confirmation of return of the initial pressure to 35.5 to 36.3 MPa, the next experiment was performed. If the initial pressure did not return to this range, the above purging procedure was repeated until the initial pressure returned to the range, and then the next experiment was performed.

Table 2 shows the evaluation results and other data in Examples 1 to 3 and Comparative Examples 1 to 4. FIG. 1 shows the die pressure changes over time in the extrusion processes of Examples 1 to 3 and Comparative Examples 1 to 4.

The shear rate calculated by the following formula 1 was about 1,200 sec$^{-1}$.

$$\gamma = \frac{4Q}{\pi R^3} \quad \text{(Formula 1)}$$

The abbreviations in the formula represent the following.
$\gamma$: shear rate (sec$^{-1}$)
Q: amount of matter extruded (kg/hr)
R: diameter of die (mm)

Table 2 and FIG. 1 show the following. In Examples 1 to 3, the pressure decrease (amount $\Delta P$ of pressure decreased) was as large as 5.6 to 5.7 MPa, and the melt fracture completely disappeared. In Comparative Examples 1 and 2, the pressure decrease (amount $\Delta P$ of pressure decreased) was smaller than that in Examples 1 to 3, and the melt fracture did not completely disappear even after 70 minutes from the start of adding the masterbatch. In Comparative Examples 3 and 4, the pressure decrease (amount $\Delta P$ of pressure decreased) was smaller than that in Examples 1 to 3, and the period of time until the melt fracture completely disappeared was 50 minutes, i.e., became longer.

As mentioned above, the processing aids used in Examples 1 to 3 have a great effect of improving the moldability in molding at a high shear rate.

(Extrusion Evaluation 2)

Example 4

The masterbatch used in Example 1 was added to and tumble-mixed with linear low-density polyethylene (LLDPE 1201XV, ExxonMobil Corp.) such that the amount of the masterbatch was 1 wt % relative to the sum of the weights of the linear low-density polyethylene and the masterbatch. The resulting mixture was extruded using a single screw extruder (Rheomex OS, HAAKE, L/D: 33, screw diameter: 20 mm, die diameter: 2 mm$\phi$×40 mmL) at a cylinder temperature of 210° C. to 240° C., a die temperature of 240° C., and a screw rotational speed of 10 rpm. The die pressure change and the melt fracture change were observed.

Comparative Example 5

Extrusion evaluation was performed in the same manner as in Example 4 except that the masterbatch used in Comparative Example 1 was added.

TABLE 2

| | Processing aid | | Amount of pressure | Melt fracture | Appearance of |
|---|---|---|---|---|---|
| | Polymer (+surfactant) | Anti-reagglomerating agent | decreased ($\Delta P$) (MPa) | disappearance time (min) | extrudate after experiment |
| Example 1 | Fluorine-containing Polymer 1 | Talc/silica/calcium carbonate | 5.7 | 20 | Glossy |
| Example 2 | Fluorine-containing Polymer 2 | Talc/silica/calcium carbonate | 5.7 | 20 | Glossy |
| Example 3 | Fluorine-containing Polymer 3 | Talc/silica/calcium carbonate | 5.6 | 20 | Glossy |
| Comparative Example 1 | FKM | Talc/silica/calcium carbonate | 4.7 | 70 or longer | Shark skin |
| Comparative Example 2 | FKM (+PEG) | — | 4.4 | 70 or longer | Shark skin |
| Comparative Example 3 | PVDF 1 | — | 4.5 | 50 | Glossy |
| Comparative Example 4 | PVDF 2 | — | 5.2 | 50 | Glossy |

Comparative Example 6

Extrusion evaluation was performed in the same manner as in Example 4 except that the masterbatch used in Comparative Example 2 was added.

Comparative Example 7

Extrusion evaluation was performed in the same manner as in Example 4 except that the masterbatch used in Comparative Example 3 was added.

Comparative Example 8

Extrusion evaluation was performed in the same manner as in Example 4 except that the masterbatch used in Comparative Example 4 was added.

Before the experiments, the extruder was purged for about 15 minutes by putting linear low-density polyethylene containing 15 wt % silica into a hopper and increasing the screw rotational speed up to 150 rpm. Then, the extruder was further purged for about 15 minutes using the same linear low-density polyethylene (LLDPE 1201XV, ExxonMobil Corp.) as used in the experiments. Thereafter, the screw rotational speed was returned to 80 rpm and extrusion was performed until the temperature was stabilized. After confirmation of return of the initial pressure to 14.3 to 14.8 MPa, the next experiment was performed. If the initial pressure did not return to this range, the above purging procedure was repeated until the initial pressure returned to the range, and then the next experiment was performed.

Figure 2:
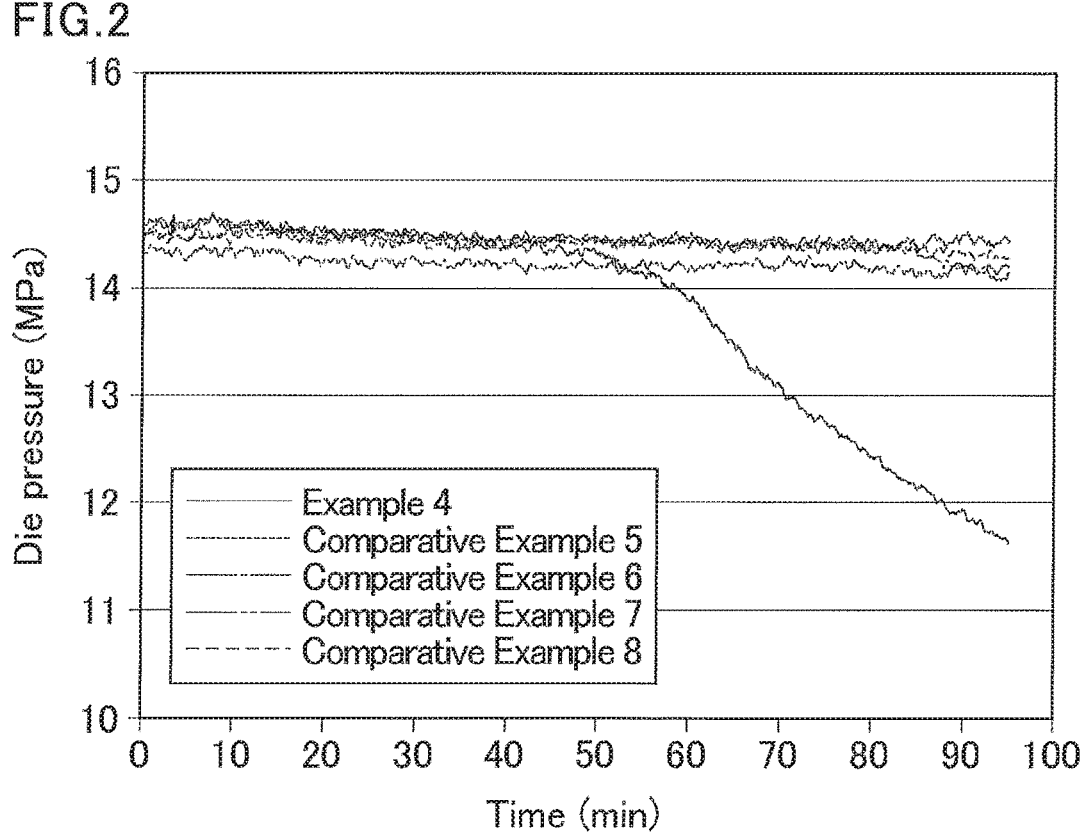
FIG. 2 is a chart of die pressure changes over time in extrusion of Example 4 and Comparative Examples 5 to 8.

Table 3 shows the evaluation results and other data in Example 4 and Comparative Examples 5 to 8. FIG. 2 shows the die pressure changes over time in the extrusion processes of Example 4 and Comparative Examples 5 to 8.

(Extrusion Evaluation 3)

Example 5

The masterbatch used in Example 1 was added to and tumble-mixed with high-density polyethylene (Vestolen A 6060R black, SABIC) such that the amount of the masterbatch was 1 wt % relative to the sum of the weights of the high-density polyethylene and the masterbatch. The resulting mixture was extruded using a single screw extruder (Rheomex OS, HAAKE, L/D: 33, screw diameter: 20 mm, die diameter: 2 mm$\phi$×40 mmL) at a cylinder temperature of 170° to 200° C., a die temperature of 200° C., and a screw rotational speed of 10 rpm. The die pressure change was observed.

No melt fracture occurred under such molding conditions.

Comparative Example 9

Extrusion evaluation was performed in the same manner as in Example 5 except that the masterbatch used in Comparative Example 1 was added.

Comparative Example 10

Extrusion evaluation was performed in the same manner as in Example 5 except that the masterbatch used in Comparative Example 2 was added.

Comparative Example 11

Extrusion evaluation was performed in the same manner as in Example 5 except that the masterbatch used in Comparative Example 3 was added.

TABLE 3

| | Processing aid | | Amount of pressure | Melt fracture | Appearance of |
| --- | --- | --- | --- | --- | --- |
| | Polymer (+surfactant) | Anti-reagglomerating agent | decreased (ΔP) (MPa) | disappearance time (min) | extrudate after experiment |
| Example 4 | Fluorine-containing Polymer 1 | Talc/silica/calcium carbonate | 3.0 | 60 | Glossy |
| Comparative Example 5 | FKM | Talc/silica/calcium carbonate | 0.1 | 70 or longer | Shark skin |
| Comparative Example 6 | FKM (+PEG) | — | 0.1 | 70 or longer | Shark skin |
| Comparative Example 7 | PVDF 1 | — | 0.4 | 60 | Glossy |
| Comparative Example 8 | PVDF 2 | — | 0.2 | 60 | Glossy |

The shear rate calculated by the above formula 1 was about 130 sec$^{-1}$.

Table 3 and FIG. 2 show the following. In Example 4, the pressure decreased by 3.0 MPa within 15 minutes from the start of adding the masterbatch, and the melt fracture completely disappeared within 60 minutes. In Comparative Examples 5 and 6, substantially no pressure decrease (amount ΔP of pressure decreased) was observed, and the melt fracture did not completely disappear even after 70 minutes from the start of adding the masterbatch. In Comparative Examples 7 and 8, substantially no pressure decrease (amount ΔP of pressure decreased) was observed as in Comparative Examples 5 and 6 although the melt fracture completely disappeared within 60 minutes.

Comparative Example 12

Extrusion evaluation was performed in the same manner as in Example 5 except that the masterbatch used in Comparative Example 4 was added.

Before the experiments, the extruder was purged for about 15 minutes by putting high-density polyethylene containing 15 wt % silica into a hopper and increasing the screw rotational speed up to 150 rpm. Then, the extruder was further purged for about 15 minutes using the same high-density polyethylene as used in the experiments. Thereafter, the screw rotational speed was returned to 10 rpm and extrusion was performed until the temperature was stabilized. After confirmation of return of the initial pressure to 14.3 to 14.8 MPa, the next experiment was performed. If the initial pressure did not return to this range, the above purging procedure was repeated until the initial pressure returned to the range, and then the next experiment was performed.

Figure 3:
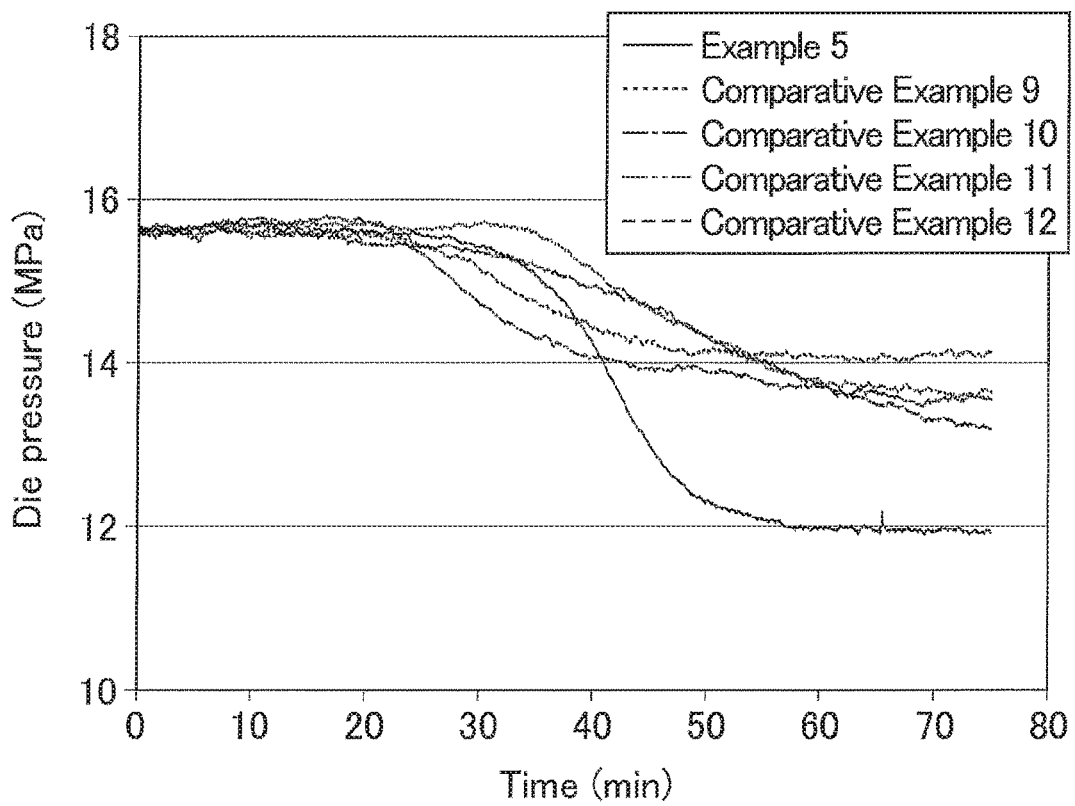
FIG. 3 is a chart of die pressure changes over time in extrusion of Example 5 and Comparative Examples 9 to 12.

Table 4 shows the evaluation results and other data in Example 5 and Comparative Examples 9 to 12. FIG. 3 shows the die pressure changes over time in the extrusion processes of Example 5 and Comparative Examples 9 to 12.

TABLE 4

|  | Processing aid | | Amount |
| --- | --- | --- | --- |
|  | Polymer (+surfactant) | Anti-reagglomerating agent | of pressure decreased (ΔP) (MPa) |
| Example 5 | Fluorine-containing Polymer 1 | Talc/silica/calcium carbonate | 3.7 |
| Comparative Example 9 | FKM | Talc/silica/calcium carbonate | 2.0 |
| Comparative Example 10 | FKM (+PEG) | — | 2.4 |
| Comparative Example 11 | PVDF 1 | — | 2.0 |
| Comparative Example 12 | PVDF 2 | — | 1.4 |

The shear rate calculated by the above formula 1 was about 130 sec$^{-1}$.

Table 4 and FIG. 3 show the following. In Example 5, the pressure decrease (amount ΔP of pressure decreased) was greater than that in Comparative Examples 9 to 12, and thus the processing aid exerts the effects thereof even in molding high-density polyethylene at a low temperature and a low shear rate.

(Extrusion evaluation 4)

Example 6

The masterbatch used in Example 1 was added to and tumble-mixed with high-density polyethylene (Vestolen A 6060R black, SABIC) such that the amount of the masterbatch was 1 wt % relative to the sum of the weights of the high-density polyethylene and the masterbatch. The resulting mixture was extruded using a single screw extruder (Rheomex OS, HAAKE, L/D: 33, screw diameter: 20 mm, die diameter: 2 mmϕ×40 mmL) at a cylinder temperature of 200° to 230° C., a die temperature of 230° C., and a screw rotational speed of 10 rpm. The die pressure change was observed.

No melt fracture occurred under such molding conditions.

Comparative Example 13

Extrusion evaluation was performed in the same manner as in Example 6 except that the masterbatch used in Comparative Example 1 was added.

Comparative Example 14

Extrusion evaluation was performed in the same manner as in Example 6 except that the masterbatch used in Comparative Example 2 was added.

Comparative Example 15

Extrusion evaluation was performed in the same manner as in Example 6 except that the masterbatch used in Comparative Example 3 was added.

Comparative Example 16

Extrusion evaluation was performed in the same manner as in Example 6 except that the masterbatch used in Comparative Example 4 was added.

Before the experimental operations, the extruder was purged for about 15 minutes by putting high-density polyethylene containing 15 wt % silica into a hopper and increasing the screw rotational speed up to 150 rpm. Then, the extruder was further purged for about 15 minutes using the same high-density polyethylene as used in the experiments. Thereafter, the screw rotational speed was returned to 10 rpm and extrusion was performed until the temperature was stabilized. After confirmation of return of the initial pressure to 13.6 to 14.2 MPa, the next experiment was performed. If the initial pressure did not return to this range, the above purging procedure was repeated until the initial pressure returned to the range, and then the next experiment was performed.

Figure 4:
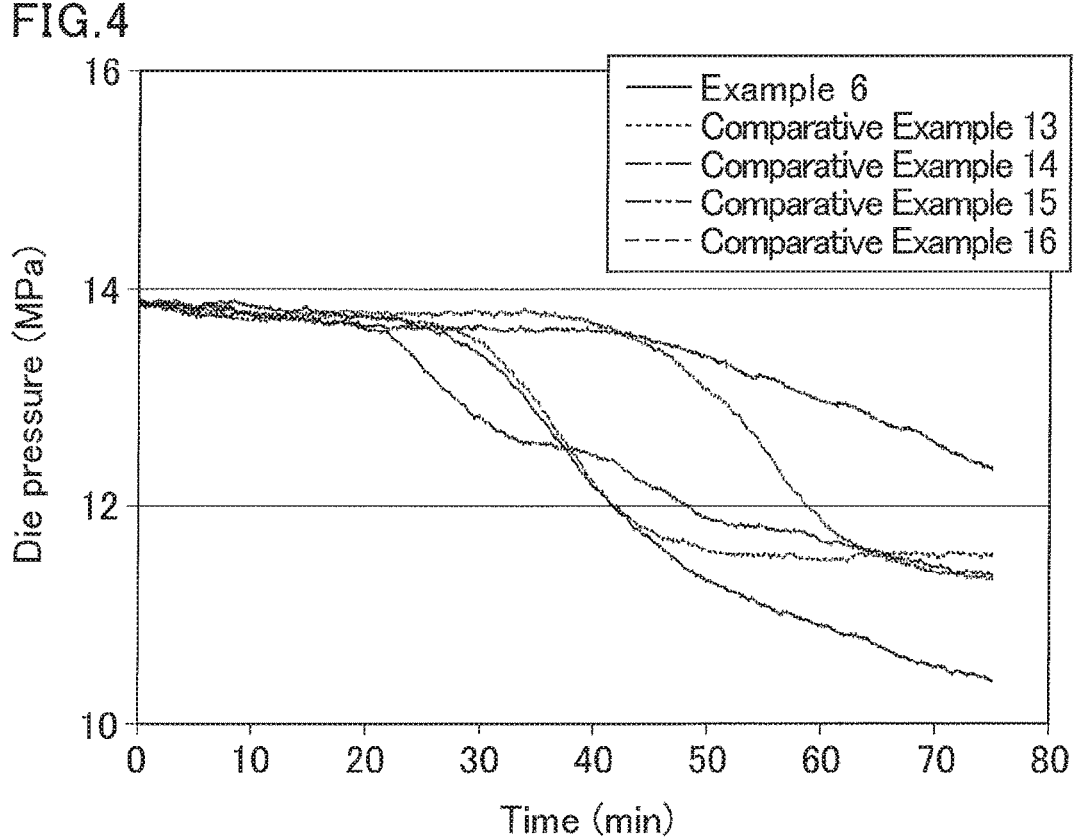
FIG. 4 is a chart of die pressure changes over time in extrusion of Example 6 and Comparative Examples 13 to 16.

Table 5 shows the evaluation results and other data in Example 5 and Comparative Examples 13 to 16. FIG. 4 shows the die pressure changes over time in the extrusion processes of Example 6 and Comparative Examples 13 to 16.

TABLE 5

|  | Processing aid | | Amount |
| --- | --- | --- | --- |
|  | Polymer (+surfactant) | Anti-reagglomerating agent | of pressure decreased (ΔP) (MPa) |
| Example 6 | Fluorine-containing Polymer 1 | Talc/silica/calcium carbonate | 3.5 |
| Comparative Example 13 | FKM | Talc/silica/calcium carbonate | 2.5 |
| Comparative Example 14 | FKM (+PEG) | — | 1.5 |
| Comparative Example 15 | PVDF 1 | — | 2.5 |
| Comparative Example 16 | PVDF 2 | — | 2.3 |

The shear rate calculated by the above formula 1 was about 130 sec$^{-1}$.

Table 5 and FIG. 4 show the following. In Example 6, the pressure decrease (amount ΔP of pressure decreased) was greater than that in Comparative Examples 13 to 16.

The above results prove that Fluorine-containing Polymer 1 exerts the effect of improving the processability within a molding temperature range used in molding high-density polyethylene into large-diameter pipes at a low shear rate.

The invention claimed is:

1. A molding composition comprising
  a processing aid, and
  a polyolefin resin,
  the processing aid comprising a polymer containing a fluorine-containing elastomeric polymer segment and a fluorine-containing non-elastomeric polymer segment, and
  the polymer being contained in an amount of 0.0001 to 10 mass % of the sum of masses of the processing aid and the polyolefin resin.

2. A molded article obtainable by molding the molding composition according to claim 1.

* * * * *